Aug. 9, 1966     D. E. CARNEY ETAL     3,265,485
METHOD AND APPARATUS FOR MELTING GLASS
Filed Oct. 16, 1961     2 Sheets-Sheet 1
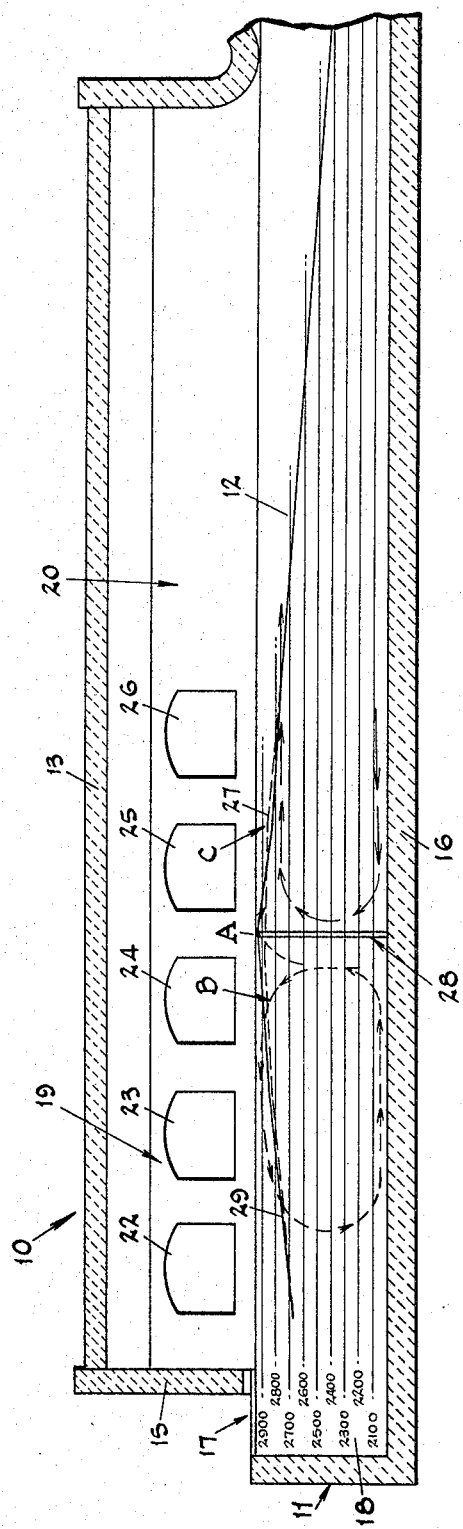
INVENTORS
Delmar E. Carney and
BY Clarence A. Hartz, Jr.
Nobbe & Swope
ATTORNEYS Aug. 9, 1966     D. E. CARNEY ETAL     3,265,485
METHOD AND APPARATUS FOR MELTING GLASS
Filed Oct. 16, 1961     2 Sheets-Sheet 2
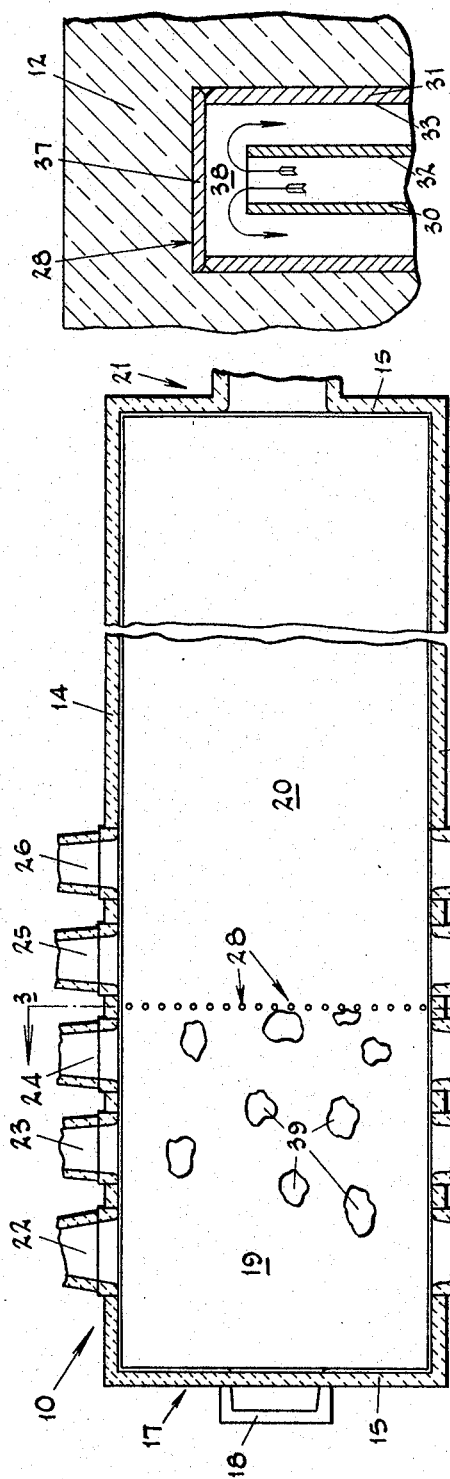
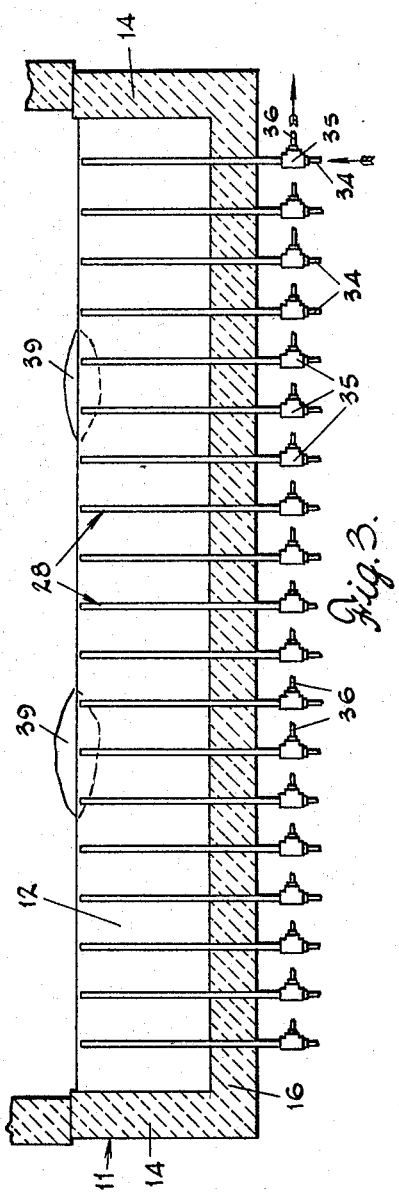
INVENTORS
Delmar E. Carney and
BY Clarence A. Startz, Jr.
Nobbe & Swope
ATTORNEYS

United States Patent Office 3,265,485
Patented August 9, 1966

3,265,485
METHOD AND APPARATUS FOR MELTING GLASS
Delmar E. Carney and Clarence A. Gartz, Jr., Toledo, Ohio, assignors to Libbey-Owens-Ford Glass Company, Toledo, Ohio, a corporation of Ohio
Filed Oct. 16, 1961, Ser. No. 145,250
8 Claims. (Cl. 65—134)

The present invention relates broadly to the art of glass melting and is more particularly concerned with a new and improved method and apparatus for melting glass making materials.

In a well known continuous process of glass manufacture, the raw batch or material to be treated is introduced into one end of the tank type melting furnace and is gradually melted and refined as it advances slowly lengthwise of the tank toward an oppositely disposed discharge end from which it is removed in the form of molten finished glass. Fusion or melting of the batch is accomplished by heat applied in the form of flames or gases of combustion directed onto the surface of the batch through ports which open into a melting compartment of the furnace above the level of the glass. Generally speaking, four to six ports are arranged at intervals along each of the opposite sides of the conventional tank furnace.

Since the molten bath of glass is continuously being removed from the tank, there is a natural flow of this bath toward the discharge end of the tank. In addition to this natural flow, there are various other currents known to exist in the molten glass, for example, thermal or convection currents resulting from uneven temperatures throughout the bath. The latter currents aid in the melting of the batch materials introduced into the tank through the doghouse since they continuously circulate the bath beneath the relatively cool batch floating thereon and thus impart heat to these materials to supplement the heat supplied through the ports.

It is, of course, essential in any glass manufacturing operation that the batch materials be completely melted or fused prior to issuance from the discharge or working end of the furnace. One of the most important factors in preventing the passage of unmelted or unfined material into the working end, and thereby assuring the production of a molten mass of uniform and homogeneous consistency, is the accurate control of the convection currents in the molten glass. While such currents are generally somewhat weak in magnitude, they bear importantly on the homogeneity of the mass since they constantly stir the bath and in addition aid in retaining unmelted batch and unfined material within the melting chamber of the furnace.

To elaborate, when the batch material is introduced into the charging end of the tank, the molten glass already in the melting chamber is cooled by the relatively cold batch thereby establishing a temperature gradient which runs longitudinally of the furnace with a region of maximum temperature being found to exist at substantially the location of the third port on a commercially employed five port furnace. Thus, it is observed that the temperature is lower at the rear or charging end of the furnace and lower at the front or discharge end than it is at the point or region at about the location of the third port. Since the glass is at its highest temperature in this area, it is expanded to its greatest extent therein and is relatively less dense than the glass in areas on either side thereof. In addition, since thermal currents flow from relatively hot areas to relatively colder areas, the glass might be said to run downhill from the hotter areas where it is expanded the most, to the relatively cool areas where it is expanded the least. The relatively hot region is often referred to as a "hot spot" and may also be designated as a "spring" due to the welling up of the liquid therein.

That molten glass actually flows downhill, in other words, that there is a positive circulation backward and forward from the hot spot, can readily be demonstrated by placing pieces of silica brick on the surface of the glass. These pieces will be found to move rearwardly in the furnace if they are back of or upstream of the hot spot, and to progress forwardly if they are ahead or downstream of said hot spot. In addition to this lengthwise movement, it will be found that the silica pieces will also travel outwardly toward the sides of the tank since the glass at said sides is relatively cooler than it is at substantially the center thereof. Such phenomena clearly illustrate that thermal currents exist and that the glass in the furnace continuously travels in certain circuits. Naturally, such thermal currents and their action in causing a backward flow of surface glass from the hot spot toward the rear of the furnace are of great importance in distributing heat to the batch thereby increasing the melting capacity of the tank and in keeping unmelted batch and unfined material from traveling down the tank and into the discharge end.

It is therefore an important object of the present invention to accentuate and to accurately control the circulation of glass in a tank furnace and thereby produce more homogeneous glass and at the same time, increasing the melting capacity of the furnace.

Another object of the invention is to substantially retard the passage of unmelted or unrefined glass into the working end of the tank furnace by improved control over the convection currents circulating within the molten mass.

Another object is to accomplish the foregoing objects by controlling the temperature gradient of the bath extending longitudinally of the furnace.

A further object is to control the temperature gradient by reducing the temperature of the bath in preselected areas of the furnace.

A further object is to accomplish the foregoing by providing cooling elements in the molten bath.

A still further object is to mechanically prevent unmelted batch material from moving out of the melting chamber of the furnace and toward the discharge end thereof.

The invention also resides in the novel construction of the cooling elements whereby they not only function to cool preselected areas of the bath but, in addition, function as a barrier or fence to mechanically prevent the larger lumps of unmelted batch material from moving out of the melting chamber of the furnace.

Other objects and advantages of the invention will become more apparent during the course of the following description when taken in connection with the accompanying drawings.

In the drawings wherein like numerals are employed to designate like parts throughout the same:

FIG. 1 is a fragmentary longitudinal sectional view taken along the center line of a melting tank embodying the novel features of the present invention;

FIG. 2 is a fragmentary sectional plan view of the melting tank;

FIG. 3 is a fragmentary sectional view taken along line 3—3 in FIG. 2; and

FIG. 4 is a fragmentary sectional view of one of the cooling elements.

With reference now to the drawings, and more particularly to FIGS. 1 and 2 thereof, wherein there is shown for purposes of illustration a portion of a continuous tank type furnace 10 embodying the novel features of the present invention. Conventionally, furnaces of this type comprise an elongated tank 11 for containing a bath 12 of molten glass and being defined by a top or roof 13, side walls 14, end walls 15, and a bottom or floor 16, all formed of a suitable refractory material. The glass-making material or raw batch is introduced into a charging end 17 of the furnace through a small vestibule 18 commonly called a "doghouse" by a feeder device (not shown) and is reduced to a molten state in a melting chamber 19 from which it flows into a conditioning or refining chamber 20 and is thereafter removed from the opposite or discharge end 21 of the furnace as a homogeneous molten material. Although the chamber 19 s termed a melting chamber, a portion of the fining action also takes place therein.

Upon its introduction into the tank 11, the batch materials float on the molten bath 12 of glass and are carried thereby through the melting chamber 19. Heat for reducing the batch to molten glass within the melting chamber 19 is provided by suitable means such as regenerators (not shown) which discharge hot gases through ports 22 through 26 opening into the melting tank 11 above the level of the bath 12 on opposite sides of the furnace. As previously mentioned, the ports 22 through 26 are arranged at intervals along both sides of the tank 11 and normally five of such ports are provided in each side wall 14 of a furnace of the character described with the port 22 nearest the doghouse 17 being identified as the first port and the remaining ports 23 through 26 being similarly identified as the second through the fifth ports consecutively away from the doghouse.

When the relatively cold raw batch is fed into the furnace 10 through the charging end 17 thereof, varying temperatures are established in the bath 11 throughout the length of said furnace 10 and there is created a so-called "hot spot" A or region of maximum temperature at approximately the location of the third port 24 and extending substantially transversely across the furnace. Due to this temperature differential and the resulting differential in the density of the molten bath 11, thermal or convection currents are established in the bath causing the bath to circulate in generally a counterclockwise direction (when viewing the tank with the doghouse on the left) in the melting chamber 19 on the charging end side of the hot spot A (as shown in FIG. 1 by the dotted arrows) and in a clockwise direction in the refining chamber 20 on the opposite side of the hot spot (shown in FIG. 1 by solid arrows). At the hot spot A, the bath 12 flows upwardly creating a spring and, since the glass is expanded the greatest at this spot, the upper surface of the bath defines a mound or hill which falls away on opposite sides thereof toward the melting chamber 19 and toward the refining chamber 20.

As shown in FIG. 1, the upper stratum of the bath 12 flows, under the influence of the thermal currents, from the hot spot A forwardly and rearwardly to the relatively colder areas of the melting and refining chambers. Thus, it will be appreciated that, in addition to stirring the molten bath 11, the thermal currents also tend to sweep smaller particles of unmelted batch and unfined materials, which appear on the surface of the bath in the form of foam, rearwardly and maintain them within the area between the third port 23 and charging end 16 of the furnace until completely fused and refined. However, it occasionally happens that the convection currents are not of sufficient magnitude to adequately circulate the molten mass with the result that the unmelted batch and unfined glass pass beyond the third port 24 or hot spot A and subsequently appear in the finished glass as a defect.

To overcome this difficulty while, at the same time, increasing the melting capacity of the furnace and producing finished glass of improved quality, the present invention contemplates accentuating and better controlling the thermal or convection currents existing in the molten bath and thereby to accelerate the circulation of the bath. By thus increasing the circulation of the bath, not only is more heat carried to the batch material introduced into the tank, but also the bath is better stirred to produce a more homogeneous mass. In addition, unmelted batch materials and foam are more readily carried backwardly toward the charging end of the furnace and thus prevented from crossing over the hot spot A into the refining chamber 20 of the tank 11.

As noted above, the density of the glass is proportional to its temperature and, therefore, the thermal currents are dependent upon the temperature of the bath. In a conventional five port furnace, the temperature of the bath increases from the charging end of the furnace toward the hot spot and thereafter decreases toward the refining chamber. The temperature differential present in the bath may be attributed partially to the manner in which the furnace is heated. As described above, in a conventional continuous tank type furnace, flames are directed transversely across the furnace from the ports 22 through 26 located in the opposite side walls 14. As a result, a transverse area of high incandescence is formed in the roof 13 extending substantially across the entire width of the tank and at approximately the location of the third port 24. This high incandescent area of the roof radiates heat downwardly into the bath and produces a substantially coextensive region of upwardly rising, opposed thermal currents which constitute the hot spot A.

As previously mentioned, since the bath 12 is hottest at the hot spot A, it is expanded and less dense than the bath in the areas on either side of the hot spot. Therefore, the molten bath 12 tends to run downhill from the hot spot A to the cooler areas of the furnace, as indicated by the arrows in FIG. 1. In the melting chamber 9, as the relatively hotter bath at the hot spot A flows upwardly under the influence of the thermal currents and approaches the surface, it absorbs more radiant heat from the roof 13 immediately overhead the hot spot and, upon reaching the surface and being swept by the currents toward the doghouse 18, the bath is additionally heated by the flames issuing from the ports 22 through 24. Upon contacting the portion of the batch below the surface of the bath, the bath carried by the currents is cooled since a certain amount of heat is taken therefrom to melt the batch. After being so cooled, the thermal currents sink downwardly toward the floor 16 of the tank 11 and, aided by the natural flow of the bath, move along the floor toward the hot spot. After entering the hot spot A, the bath 12 within the currents is again drawn upwardly before being swept once more toward the doghouse to repeat the flow cycle. It will be understood, of course, that due to the natural flow of the bath 12 in the tank 11, a certain portion of the bath in the upwardly rising thermal currents will be drawn into the refining chamber 20 and thus moved toward the discharge end 21 of the tank 11.

In a conventional furnace, the temperature gradient existing in the bath 12 may be illustrated by a curve on a graph such as the curve 27 illustrated by the broken line in FIG. 1. As shown by this curve 27, the temperature gradient rises steadily from the charging end 17 of the tank 11 to a point B approximately midway of the third port 24. At this point B, the curve 27 rounds off to a somewhat smooth mound as it were, which continues to a point C on the downstream side of the fourth port 25 whereupon it falls steadily away toward the refining chamber 20. Thus, it will be appreciated that in the area of the mound in the temperature gradient curve 27, which incidentally also appears as a mound on the upper surface of the bath, the slope of the curve 27 flattens or rounds out and there is very little change in temperature and thus in density of the bath between the point B midway of the third port 24 and the point C downstream of the fourth port. Naturally, since the flow of the upper surface of the bath 12 results from a downhill flow from the hot spot A toward the charging end 17, the greater the change in the density of the glass per unit length from the hot spot A toward the charging end 17, the greater the velocity of flow. Based upon these considerations, the method of controlling the thermal currents contemplated by the invention includes controlling the temperature within this critical area adjacent the hot spot; that is, in effect, by controlling the slope of the curve 27 representing the temperature gradient whereby it is steeper adjacent the hot spot indicating a greater temperature and density differential per unit length which results in a greater velocity of flow.

Herein, the control of the temperature gradient and thus of the convection currents is accomplished in a novel manner by absorbing heat from preselected areas of the bath so as to increase the temperature differential per unit length of the bath in at least those portions of the bath adjacent the hot spot. The exact phenomenon which occurs when the present invention is practiced is not fully understood but it is believed that a greater differential in density per unit length of the bath is created which accelerates the thermal currents whereby the latter carries the hotter bath to the batch at a faster rate thereby increasing the melting capacity of the furnace without introducing additional heat into the furnace. In addition, the accelerated thermal currents more thoroughly stir the bath and more forcibly sweep the foam on the surface of the bath toward the charging end of the tank whereby a more homogeneous and defect-free finished glass is produced.

The areas of the bath 12 from which heat is absorbed may, of course, vary in location and will depend entirely upon the desired modification of the temperature gradient extending longitudinally of the bath. Preferably, the areas are in relatively close proximity with the hot spot A. Excellent results have been obtained by absorbing heat from an area coextensive with the hot spot A; that is, from an area extending transversely of the tank and substantially across the width thereof. However, it has been found that the desired temperature gradient of the bath may be accomplished by absorbing heat from the bath at a location slightly upstream of the hot spot A.

Here again, the observed effect of absorbing heat from the bath as described above may be illustrated by a curve on the graph depicted in FIG. 1 such as the curve 29 shown in full line. As shown by this curve, a greater differential in temperature per unit length is established in the bath 12 in the vicinity of the hot spot A as evidenced by the fact that the curve representing the temperature gradient of the bath as modified by the invention has a steeper slope than the curve 27 representing the temperature gradient of the bath in a conventional melting furnace. As shown in FIG. 1, the temperature of the bath 12 rises steadily from the charging end 17 of the tank 11 to the hot spot A and thereafter decreases steadily downstream of the hot spot and into the refining chamber 20. In addition, as illustrated by the curve 29, it has been found that by some phenomenon which is not understood, the maximum temperature of the bath 12 at the hot spot A is greater than the maximum temperature shown by the curve 27. By way of explanation and based entirely upon speculation, it is suggested that perhaps the accelerated thermal currents, created in accordance with the invention, result in a hot spot of smaller area and thereby of more concentrated heat. In other words, the heat required in a conventional tank to maintain the temperatures illustrated by curve 27 between points B and C is redistributed, resulting in lower temperatures adjacent point C and higher temperatures at the hot spot A.

While various methods and devices may be utilized to absorb heat in the desired manner from the bath, in the present instance, the heat absorption is accomplished through the medium of cooling elements 28 immersed in the molten bath 12. The elements 28 are located in the desired positions as described above and extend through the walls or floor of the tank so as to conduct the heat absorbed from the bath away from the interior of the tank. Preferably, the elements comprise conduits through which may be circulated a fluid operable to absorb heat while passing through the portion of the conduit immersed in the bath and to discharge it outwardly of the tank.

In general, the cooling elements 28, in the present instance, comprise pipes projecting into the bath along a common axis and being arranged relative to each other to define a passageway through which is circulated a heat-absorbing medium introduced into one end of the passageway to flow therethrough to an outlet at the opposite end of the passageway.

Each of the exemplary elements 28, as best shown in FIG. 4, comprises two such pipes 30 and 31 defining concentric inner and outer passageways 32 and 33. One end of the inner pipe 30 defines an inlet opening 34 to the inner passageway, which opening is coupled to a source of heat-absorbing fluid such as water or the like. The adjacent end of the outer pipe 31 is coupled to a fitting 35 defining an outlet opening 36 in the outer passageway 33 through which opening the fluid is discharged from the outer passageway. The opposite end of the outer pipe 31 is capped by a disk 37 fixed as by welding to the end of the pipe 33 and sealing the passageways 32 and 33 from the bath 12 in which they are immersed. The inner pipe 30 terminates adjacent to but spaced from the disk 37 to provide an annular gap 38 connecting the inner and outer passageways. The heat-absorbing fluid entering through the inlet opening 34 flows in one direction along the inner passageway 32, through the gap 38 into the outer passageway 33 and along the outer passageway in the opposite direction to the flow in the inner passageway to the outlet opening 36. In flowing through the passageways 32 and 33, the fluid absorbs heat from the surrounding bath 12 and conveys it out of the tank 11.

Any number of the cooling elements 28 may be utilized and these elements may be projected through the side walls 14 or the floor 16 and into the bath at any angle. The controlling factor as to number and disposition naturally being the desired result to be achieved. In the present instance, as shown in FIGS. 2 and 3, a series of the elements arranged along a line extending transversely across the tank 11 are utilized. The elements 28 are projected upwardly through the floor 16 of the tank to extend along parallel vertical axes into the bath 12. It will be appreciated that the amount of heat removed from the bath depends to a great extent upon the rate of flow of the heat-absorbing fluid through the elements 28 and thus the heat removal can be varied over a relatively wide range with any number and arrangement of the cooling elements.

In the production of glass in a continuous tank type furnace of the above described character, the batch material introduced into the tank 11 does not all melt at the same time and at the same rate resulting in relatively large lumps 39 of the unmelted batch material being carried downstream through the melting chamber 19 and toward the hot spot A by the natural flow of the bath 12 through the tank. Due to the relatively large size and mass of these lumps, the backward or upstream flow of the upper surface of the bath under the influence of thermal currents in the melting chamber has very little effect upon their movement toward the hot spot. Thus, these lumps 39 of unmelted batch material have been observed to pass over the hot spot A and move from the melting chamber 19 into the refining chamber 20 of the tank 11 thereby contaminating the bath 12 in the latter chamber and giving rise to various defects in the finished glass.

In accordance with another aspect of the present invention, these relatively large lumps of unmelted batch material are mechanically retained in the melting chamber 19 of the tank until sufficiently melted and reduced in size to enable the thermal currents to sweep them upstream of the hot spot A. To this end, a barrier or fence is provided adjacent the upper surface of the bath, dividing the melting chamber 19 from the refining chamber 20 and being operable to impale the lumps and prevent their moving past the hot spot.

Further, in accordance with the invention, the function of impaling the lumps and of absorbing heat from the batch is performed by one simple and inexpensive apparatus. To this end, the tubular cooling elements 28 project vertically through the floor 16 of the tank 11 and upwardly into the bath 12 to terminate adjacent to but below the upper surface of the bath. The pipes 30 and 31 comprising the cooling elements 28 are spaced relatively close together along the transverse line extending across the entire width of the tank to prevent passage of the unmelted lumps 39 between adjacent elements. It has been found that a spacing of approximately sixteen inches between centers is satisfactory but this may be varied in either direction. As mentioned above, the elements 28 need hold the lumps 39 in the melting chamber only until their size is reduced sufficiently to permit the thermal currents to sweep them toward the charging end 17 of the tank 11.

It will be apparent that the invention described above enables the melting capacity of a glass melting furnace to be increased without the introduction of additional heat into the furnace. Moreover, the finished glass produced by the furnace is of an improved quality as regards homogeneity and defects. By means of the accelerated thermal currents, the small particles of unmelted batch and foam are prevented from entering the refining chamber and thus appearing in the finished glass as defects. The large lumps of unmelted batch which would not be affected by the thermal currents are held by the barrier or fence in the heating chamber until they are reduced to a size permitting the thermal currents to sweep them back into the melting chamber. All this is accomplished by the relatively simple and inexpensive apparatus comprising merely a line of concentric pipes extending upwardly through the floor of the furnace and into the bath. Not only does the heat-absorbing fluid flowing through these pipes aid in modifying and controlling the temperature gradient extending longitudinally of the tank but, in addition, it aids in prolonging the service life of the pipes which also serve as the fence to mechanically block passage of large lumps of unmelted batch from the refining chamber.

It is to be understood that the forms of the invention herewith shown and described are to be taken as illustrative embodiments only of the same, and that various changes in the shape, size and arrangement of parts, as well as various procedural changes may be resorted to without departing from the spirit of the invention.

We claim:

1. In a method of producing glass in a continuous tank furnace containing a bath of molten material, the steps of, heating said bath to produce a temperature gradient in the bath with the temperature being greatest in a single region intermediate the ends of the tank, said temperature gradient producing thermal currents circulating in said bath, and absorbing heat from said bath adjacent said region of greatest temperature to accelerate said thermal currents produced by said temperature gradient.

2. In a method of producing glass in a continuous tank furnace containing a bath of molten glass flowing from a charging end through melting and refining chambers to an oppositely disposed discharge end, the steps of, introducing batch material into the furnace at the charging end to float on said bath and to be carried thereby through said melting chamber, heating the bath and the batch to produce a temperature gradient in the bath with the temperature being greatest in a region between the melting and refining chambers and decreasing longitudinally of the furnace toward the charging end, said temperature gradient producing thermal currents flowing upwardly at the region of greatest temperature and toward the charging end of the furnace along the upper surface of the bath in the melting chamber, and absorbing heat from said bath adjacent the region of greatest temperature, thereby to modify said temperature gradient and to accelerate said thermal currents flowing along the upper surface of said bath in said melting chamber.

3. In a method of producing glass in a continuous tank furnace containing a bath of molten glass having a natural flow from a charging end of the furnace through melting and refining chambers to an oppositely disposed discharge end, the steps of, introducing batch material to be melted into the charging end of the furnace to float on said bath and to be carried thereby through said melting chamber, heating said bath and said batch to melt the latter and to produce a temperature gradient in the bath with the temperature being greatest in a region between the melting and refining chambers, said temperature gradient producing thermal currents in said bath flowing along the upper surface of the bath in the melting chamber in a direction opposite to the natural flow carrying the batch materials therethrough, absorbing heat from said bath adjacent the region of greatest temperature thereby to accelerate said thermal currents to sweep relatively small, unmelted particles of batch materials toward said charging end and prevent their being carried by the natural flow of the bath into said refining chamber, and mechanically maintaining larger lumps of unmelted batch material in said melting chamber until sufficiently reduced in size to be swept toward said charging end by said thermal currents.

4. In a continuous glass furnace having a tank containing a bath of molten glass flowing from a charging end through melting and refining chambers to an oppositely disposed discharge end with batch material being introduced into said charging end to float on said bath and to be carried thereby through said melting chamber, heating means directing heat into said furnace to melt said batch material and to produce thermal currents in said bath flowing along the upper surface of said bath in said melting chamber toward the charging end of said furnace and being operable to distribute heat evenly throughout the bath and to sweep relatively small unmelted particles of said batch materials toward said charging end thereby to prevent their entry into said refining chamber, and a plurality of barrier elements disposed in said bath and extending transversely across said tank between said melting and refining chambers to mechanically prevent relatively large lumps of unmelted batch materials from entering said refining chamber without obstructing the flow of said molten bath.

5. In a continuous glass producing furnace as defined in claim 4, said barrier means comprising a plurality of heat absorbing means projecting upwardly into said bath to terminate adjacent to but below said upper surface thereof, and being disposed along parallel axes lying in a vertical plane extending transversely of said furnace between said melting and said refining chambers.

6. In a continuous glass-melting furnace having an elongated tank containing a bath of molten glass flowing from a charging end through melting and refining chambers to an oppositely disposed discharge end and adapted to receive batch material in said charging end to float on said bath and to be carried thereby through said melting chamber, heating means directing heat into said furnace to melt said batch material and to produce thermal currents in said bath flowing along the upper surface thereof in said melting chamber toward the charging end of said tank and being operable to evenly distribute heat throughout the bath and to sweep relatively small unmelted particles of batch materials toward the charging end thereby to prevent their entry into said refining end, heat absorbing means immersed in said bath between said melting and refining chambers, said heat absorbing means extending transversely across said tank and through said molten bath to prevent passage of relatively large lumps of unmelted batch material along said tank from said melting chamber and into said refining chamber.

7. In a continuous glass producing furnace as defined in claim 6, in which said heat absorbing means comprises substantially vertical pipes extending upwardly through said bath to terminate adjacent to but below the upper surface thereof defining a passageway through which a heat absorbing fluid medium is circulated.

8. In a continuous glass producing furnace as defined in claim 6, said heat absorbing means comprising a plurality of pipes telescoped together and projecting into said bath along a common axis to define concentric passageways through which said heat absorbing medium is circulated.

References Cited by the Examiner
UNITED STATES PATENTS

| | | | |
|---|---|---|---|
| 2,119,947 | 6/1938 | Blau et al. | 65—134 |
| 2,119,949 | 6/1938 | Peyches | 65—347 X |
| 2,293,948 | 8/1942 | Peyches | 65—347 X |

DONALL H. SYLVESTER, *Primary Examiner.*

F. W. MIGA, *Assistant Examiner.*